(12) United States Patent
Imanishi et al.

(10) Patent No.: US 11,639,111 B2
(45) Date of Patent: May 2, 2023

(54) CONTROL SYSTEM FOR AND CONTROL METHOD OF ELECTRIC VEHICLE

(71) Applicant: TOYOTA JIDOSHA KABUSHIKI KAISHA, Toyota (JP)

(72) Inventors: Masahiro Imanishi, Gotemba (JP); Kouzo Matsuura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 15/115,754

(22) PCT Filed: Feb. 10, 2015

(86) PCT No.: PCT/JP2015/053628
§ 371 (c)(1),
(2) Date: Aug. 1, 2016

(87) PCT Pub. No.: WO2015/151588
PCT Pub. Date: Oct. 8, 2015

(65) Prior Publication Data
US 2017/0008399 A1    Jan. 12, 2017

(30) Foreign Application Priority Data

Apr. 2, 2014    (JP) .............................. JP2014-076444

(51) Int. Cl.
*H01M 8/04089*        (2016.01)
*H01M 8/04223*        (2016.01)
(Continued)

(52) U.S. Cl.
CPC ............. *B60L 3/0007* (2013.01); *B60L 1/003* (2013.01); *B60L 3/0069* (2013.01); *B60L 3/04* (2013.01);
(Continued)

(58) Field of Classification Search
None
See application file for complete search history.

(56) References Cited

U.S. PATENT DOCUMENTS

| 7,690,458 B2 * | 4/2010 | Ueda ........................ B03B 9/06 |
| | | 180/65.31 |
| 2003/0111971 A1 | 6/2003 | Ishikawa et al. |

(Continued)

FOREIGN PATENT DOCUMENTS

| DE | 112012005937 T5 | 12/2014 |
| JP | 2003-189415 A | 7/2003 |

(Continued)

OTHER PUBLICATIONS

Bar-Cohen, Avram. (2013). Encyclopedia of Thermal Packaging (Set 1) Thermal Packaging Techniques, vols. 1-6. World Scientific, pp. 74-75. (Year: 2013).*

*Primary Examiner* — Cynthia H Kelly
*Assistant Examiner* — Julian Anthony
(74) *Attorney, Agent, or Firm* — Hunton Andrews Kurth LLP

(57) ABSTRACT

To make a fuel cell stack reliably discharge at the time of vehicle collision, a control system for an electric vehicle is provided with a fuel cell stack generating electric power by an electrochemical reaction between fuel gas and oxidizing gas and supplying generated electric power to an electric motor for driving the vehicle, a first electrical resistor for discharge electrically connected to the fuel cell stack through an electrically controlled type discharge switch, a discharge control circuit controlling an on/off state of the discharge switch, and a collision detector detecting a vehicle collision and outputting a collision signal to the discharge control circuit. When a collision signal is input to the discharge control circuit, it turns the discharge switch on and electrically connects the fuel cell stack to the first electrical (Continued)

resistor for discharge, to thereby discharge the fuel cell stack. A power supply of the discharge control circuit is comprised of the fuel cell stack.

3 Claims, 7 Drawing Sheets

(51) Int. Cl.
*H01M 8/04313* (2016.01)
*B60L 3/00* (2019.01)
*H01M 8/04955* (2016.01)
*H01M 8/04664* (2016.01)
*H01M 8/04746* (2016.01)
*B60L 3/04* (2006.01)
*H01M 8/04228* (2016.01)
*H01M 8/04858* (2016.01)
*H01M 8/04303* (2016.01)
*B60L 1/00* (2006.01)
*B60L 58/33* (2019.01)
*B60L 50/51* (2019.01)
*H01M 8/04992* (2016.01)

(52) U.S. Cl.
CPC ............... *B60L 50/51* (2019.02); *B60L 58/33* (2019.02); *H01M 8/0488* (2013.01); *H01M 8/0494* (2013.01); *H01M 8/04228* (2016.02); *H01M 8/04303* (2016.02); *H01M 8/04664* (2013.01); *H01M 8/04753* (2013.01); *H01M 8/04955* (2013.01); *B60L 2210/14* (2013.01); *H01M 8/04992* (2013.01); *H01M 2250/20* (2013.01); *Y02T 10/72* (2013.01); *Y02T 90/40* (2013.01)

(56) References Cited

U.S. PATENT DOCUMENTS

| | | | | |
|---|---|---|---|---|
| 2003/0113600 | A1* | 6/2003 | Wardrop | H01M 8/04559 |
| | | | | 429/432 |
| 2004/0072042 | A1 | 4/2004 | Kim | |
| 2008/0038602 | A1* | 2/2008 | Yu | H01M 8/2457 |
| | | | | 429/415 |
| 2008/0081224 | A1* | 4/2008 | Burch | B60L 58/20 |
| | | | | 429/432 |
| 2011/0020720 | A1* | 1/2011 | Chatroux | H02M 3/1584 |
| | | | | 429/431 |
| 2014/0015311 | A1* | 1/2014 | Spjuth | B60L 3/04 |
| | | | | 307/9.1 |
| 2014/0106251 | A1* | 4/2014 | Ohtani | H01M 8/04238 |
| | | | | 429/432 |
| 2015/0021114 | A1 | 1/2015 | Hotta et al. | |
| 2015/0034406 | A1 | 2/2015 | Hirose | |

FOREIGN PATENT DOCUMENTS

| | | |
|---|---|---|
| JP | 2004-139950 A | 5/2004 |
| JP | 2013-027275 A | 2/2013 |
| KR | 2013 0122011 A | 11/2013 |
| WO | 2013/014745 A1 | 1/2013 |
| WO | 2013/125010 A1 | 8/2013 |

* cited by examiner

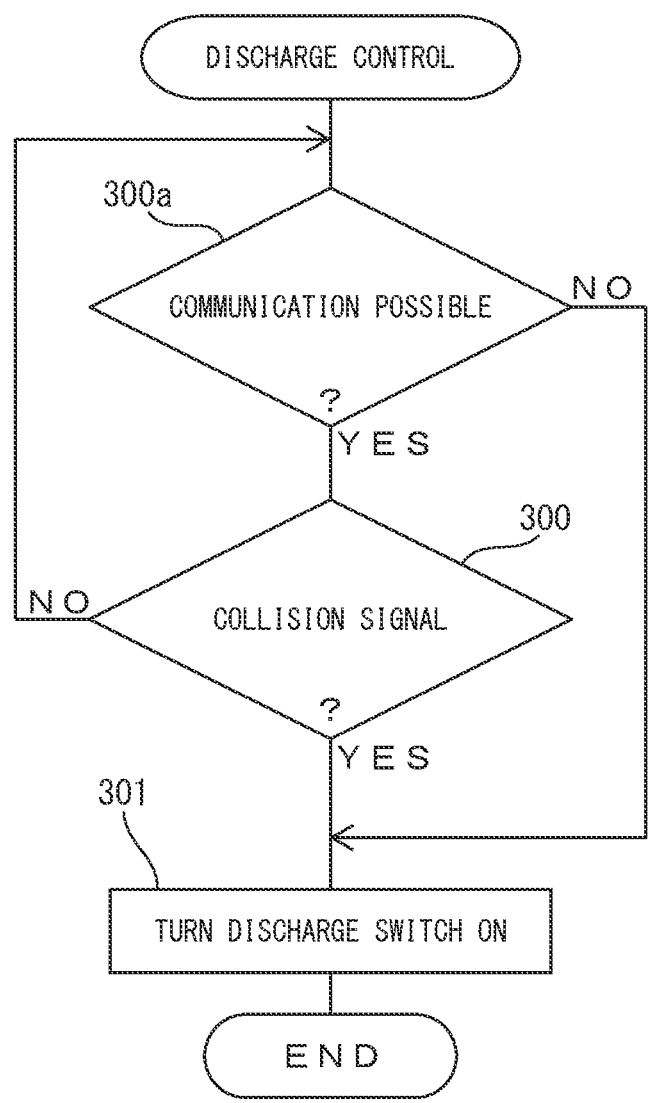

CONTROL SYSTEM FOR AND CONTROL METHOD OF ELECTRIC VEHICLE

CROSS-REFERENCE TO RELATED APPLICATIONS

This is a national phase application based on the PCT International Patent Application No. PCT/JP2015/053628 filed Feb. 10, 2015, claiming priority to Japanese Patent Application No. 2014-076444 filed Apr. 2, 2014, the entire contents of both of which are incorporated herein by reference.

TECHNICAL FIELD

The present invention relates to a control system for and control method of an electric vehicle.

BACKGROUND ART

A control system for an electric vehicle is known in the art, which is provided with a fuel cell stack generating electric power by an electrochemical reaction between fuel gas and oxidizing gas and supplying generated electric power to an electric motor for driving the vehicle, a first electrical resistor for discharge which is electrically connected to the fuel cell stack through an electrically controlled type discharge switch, a discharge control circuit controlling an on/off state of the discharge switch, and a collision detector detecting a vehicle collision and outputting a collision signal to the discharge control circuit, wherein the discharge control circuit turns the discharge switch on to electrically connects the fuel cell stack to the first electrical resistor for discharge when a collision signal is input to the discharge control circuit, to thereby discharge the fuel cell stack (see PTL 1). If the fuel cell stack remains at a high voltage at the time of vehicle collision, an operator may receive an electric shock. Therefore, in PTL 1, at the time of vehicle collision, the fuel cell stack is made to discharge to thereby make the voltage of the fuel cell stack fall.

CITATIONS LIST

Patent Literature

PTL 1: Japanese Patent Publication No. 2013-027275A

SUMMARY OF INVENTION

Technical Problem

While PTL 1 does not include a specific description, a discharge control circuit usually operates by receiving drive voltage from a power supply. In other words, when the voltage of the power supply is lower than the drive voltage, the discharge switch cannot be turned on. Therefore, the fuel cell stack cannot be made to discharge. In this regard, if the discharge switch continues to be left on, the voltage of the power supply will gradually fall. For this reason, if the voltage of the power supply becomes lower than the drive voltage during discharge of the fuel cell stack, the fuel cell stack is no longer discharged. The same is true when the voltage of the power supply is lower than the drive voltage from the start of the vehicle collision. Further, for example, when the electrical connection between the discharge control circuit and the power supply or the electrical connection between the discharge control circuit and the discharge switch is broken due to vehicle collision, the discharge switch cannot be turned on and, therefore, the fuel cell stack cannot be made to discharge. Furthermore, when the electrical connection between the collision detector and the discharge control circuit is broken, a collision signal will not be input to the discharge control circuit even if a vehicle collision occurs and, therefore, the fuel cell stack will not be discharged.

Solution to Problem

According to one aspect of the present invention, there is provided a control system for an electric vehicle comprising: a fuel cell stack configured to generate electric power by an electrochemical reaction between fuel gas and oxidizing gas and to supply the generated electric power to an electric motor for driving the vehicle; a first electrical resistor for discharge which is electrically connected to the fuel cell stack through an electrically controlled type discharge switch; a discharge control circuit configured to control an on/off state of the discharge switch; and a collision detector configured to detect a vehicle collision and to output a collision signal to the discharge control circuit, wherein, when a collision signal is input to the discharge control circuit, the discharge control circuit turns the discharge switch on to electrically connect the fuel cell stack to the first electrical resistor for discharge, to thereby discharge the fuel cell stack, and wherein a power supply of the discharge control circuit is comprised of the fuel cell stack.

According to another aspect of the present invention, there is provided a control system for an electric vehicle comprising: a fuel cell stack configured to generate electric power by an electrochemical reaction between fuel gas and oxidizing gas and to supply the generated electric power to an electric motor for driving the vehicle; a first electrical resistor for discharge which is electrically connected to the fuel cell stack through an electrically controlled type discharge switch; a discharge control circuit configured to control an on/off state of the discharge switch; and a collision detector configured to detect a vehicle collision and to output a collision signal to the discharge control circuit, wherein, if the discharge switch is turned on, the fuel cell stack is electrically connected to the first electrical resistor for discharge, to thereby discharge the fuel cell stack, and wherein the control system is configured to judge if communication between the discharge control circuit and the collision detector is possible, to turn the discharge switch on upon a collision signal being input when the communication is judged to be possible, and to turn the discharge switch on even without a collision signal being input when the communication is judged to be impossible.

According to still another aspect of the present invention, there is provided a control method of an electric vehicle, the vehicle comprising: a fuel cell stack configured to generate electric power by an electrochemical reaction between fuel gas and oxidizing gas and to supply the generated electric power to an electric motor for driving the vehicle; a first electrical resistor for discharge which is electrically connected to the fuel cell stack through an electrically controlled type discharge switch; a discharge control circuit configured to control an on/off state of the discharge switch; and a collision detector configured to detect a vehicle collision and to output a collision signal to the discharge control circuit, wherein, if the discharge switch is turned on, the fuel cell stack is electrically connected to the first electrical resistor for discharge, to thereby discharge the fuel cell stack, the control method comprising steps of: judging if communication between the discharge control circuit and other control circuit is possible; and turning the discharge switch on upon a collision signal being input when the communication is judged to be possible, and turning the discharge switch on even without a collision signal being input when the communication is judged to be impossible.

Advantageous Effects of Invention

It is possible to reliably make the fuel cell stack discharge at the time of a vehicle collision.

BRIEF DESCRIPTION OF DRAWINGS

FIG. 7 is a flow chart for performing a routine of discharge control of another embodiment according to the present invention.

DESCRIPTION OF EMBODIMENTS

Figure 1:
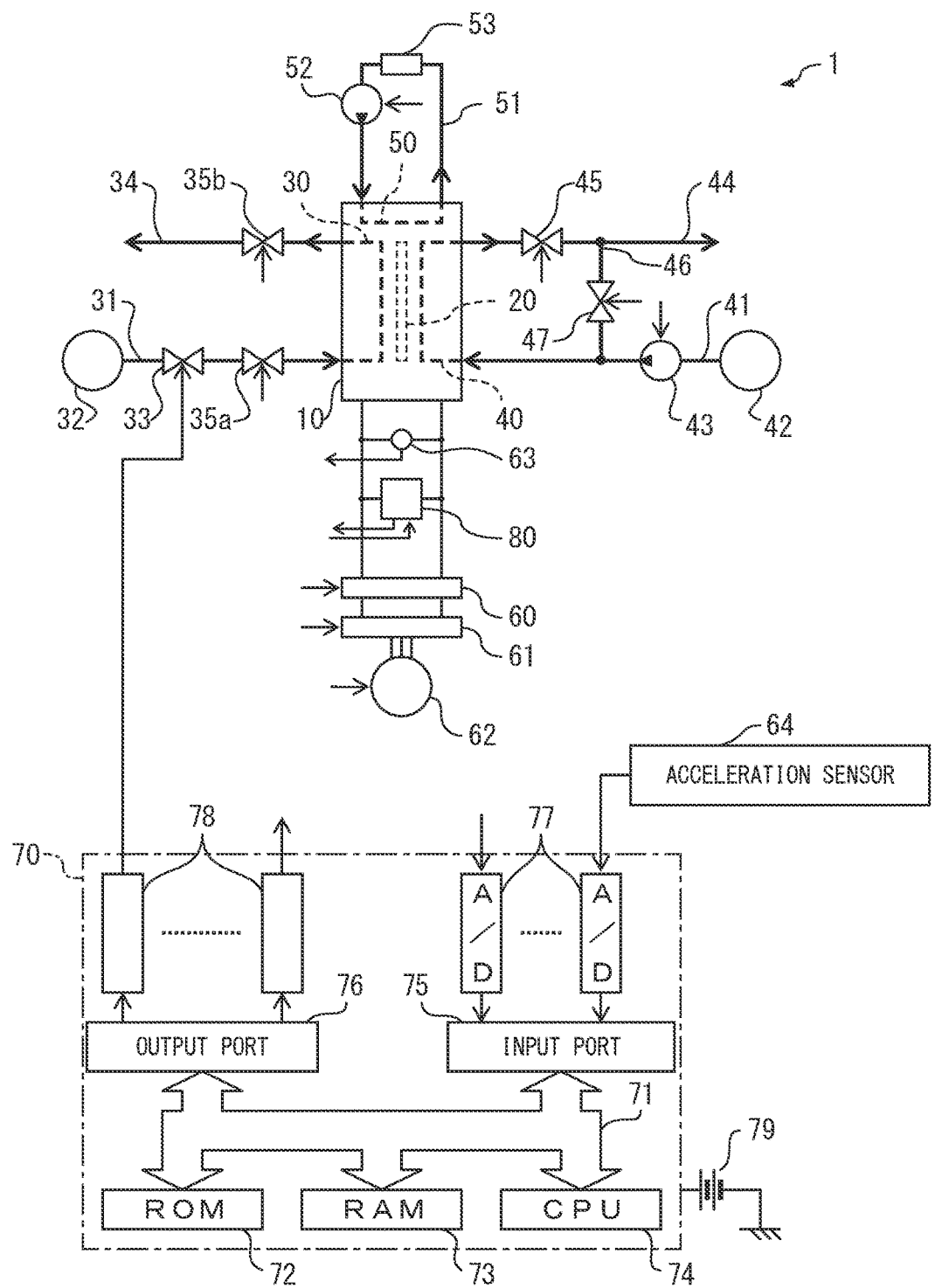
FIG. 1 is an overall view of a fuel cell system of an electric vehicle.

Referring to FIG. 1, a fuel cell system 1 mounted in an electric vehicle is provided with a fuel cell stack 10. The fuel cell stack 10 is provided with a plurality of unit fuel cells which are stacked with each other in a stacking direction. Each unit fuel cell includes a membrane electrode assembly 20. The membrane electrode assembly 20 is provided with a membrane shaped electrolyte, an anode formed on one side of the electrolyte, and a cathode formed on the other side of the electrolyte. Further, a flow gas flow path for feeding the anode a fuel gas, an oxidizing gas flow path feeding the cathode an oxidizing gas, and a cooling water flow path for feeding cooling water to the unit fuel cell are formed in each unit fuel cell, respectively. By connecting in series the fuel gas flow paths, oxidizing gas flow paths, and cooling water flow paths of the plurality of unit fuel cells, a fuel gas passage 30, oxidizing gas passage 40, and cooling water passage 50 are formed in the fuel cell stack 10, respectively. In the embodiment shown in FIG. 1, in the fuel cell stack 10, a volume of the fuel gas passage 30 and a volume of the oxidizing gas passage 40 are substantially equal to each other. Note that the electric vehicle is formed with a passenger compartment (not shown) and a storage compartment (not shown) which is formed outward from the passenger compartment in a vehicle length direction. Part or all of the elements of the fuel cell system 1 are housed in the storage compartment.

A fuel gas feed path 31 is connected with an inlet of the fuel gas passage 30, and is connected to a fuel gas supply 32. In this embodiment according to the present invention, the fuel gas is formed from hydrogen, and the fuel gas supply 32 is formed from a hydrogen tank. An electromagnetic type fuel gas control valve 33 for controlling an amount of fuel gas flowing through the fuel gas feed path 31 is arranged in the fuel gas feed path 31. On the other hand, an anode off-gas passage 34 is connected with an outlet of the fuel gas passage 30. If the fuel gas control valve 33 is opened, the fuel gas in the fuel gas supply 32 is fed through the fuel gas feed path 31 into the fuel gas passage 30 in the fuel cell stack 10. At this time, a gas flowing out from the fuel gas passage 30, that is, an anode off-gas, flows into the anode off-gas passage 34. Further, electromagnetic type fuel gas sealing valves 35a, 35b are respectively arranged in the fuel gas feed path 31 adjoining the inlet of the fuel gas passage 30 and in the anode off-gas passage 34 adjoining the outlet of the fuel gas passage 30. The fuel gas sealing valves 35a, 35b are normally opened.

Further, an oxidizing gas feed path 41 is connected with an inlet of the oxidizing gas passage 40, and is connected to an oxidizing gas source 42. In this embodiment of the present invention, the oxidizing gas is formed from air, and the oxidizing gas source 42 is formed from the air atmosphere. An oxidizing gas feeder or compressor 43 pumping oxidizing gas is arranged in the oxidizing gas feed path 41. On the other hand, a cathode off-gas passage 44 is connected with an outlet of the oxidizing gas passage 40. If the compressor 43 is driven, oxidizing gas in the oxidizing gas source 42 is fed through the oxidizing gas feed path 41 into the oxidizing gas passage 40 in the fuel cell stack 10. A gas flowing out from the oxidizing gas passage 40 at this time, that is, a cathode off-gas, flows into the cathode off-gas passage 44. An electromagnetic type cathode off-gas control valve 45 controlling an amount of cathode off-gas flowing through the cathode off-gas passage 44 is arranged in the cathode off-gas passage 44. Furthermore, the oxidizing gas passage 40 downstream of the compressor 43 and the cathode off-gas passage 44 downstream of the cathode off-gas control valve 45 are connected with each other by a stack bypass passage 46. An electromagnetic type stack bypass control valve 47 controlling an amount of oxidizing gas flowing through the stack bypass passage 46 is arranged in the stack bypass passage 46. If the stack bypass control valve 47 is opened, part or all of the oxidizing gas discharged from the compressor 43 runs through the stack bypass passage 46, that is, bypasses the fuel cell stack 10, and flows into the cathode off-gas passage 44. Note that, in the embodiment shown in FIG. 1, even if the opening degree of the cathode off-gas control valve 45 is a minimum opening degree, a slight amount of oxidizing gas or air can pass through the cathode off-gas control valve 45. Further, when the compressor 43 is stopped, a slight amount of oxidizing gas or air can pass through the compressor 43.

Furthermore, referring to FIG. 1, one end of the cooling water feed path 51 is connected with an inlet of the cooling water passage 50, while the other end of the cooling water feed path 51 is connected with an outlet of the cooling water feed path 51. A cooling water pump 52 pumping cooling water and a radiator 53 are arranged in the cooling water feed path 51. If the cooling water pump 52 is driven, the cooling water discharged from the cooling water pump 52 flows through the cooling water feed path 51 to the cooling water passage 50 in the fuel cell stack 10, next passes through the cooling water passage 50 and flows into the cooling water feed path 51, then returns to the cooling water pump 52.

Further, the anodes and cathodes of the unit fuel cells are electrically connected in series and form electrodes of the fuel cell stack 10. The two electrodes of the fuel cell stack 10 are electrically connected to a booster converter 60 for raising a voltage from the fuel cell stack 10. The booster converter 60 is electrically connected to an inverter 61 for converting DC current from the booster converter 60 to AC current, and the inverter 61 is electrically connected to a motor-generator 62. Further, a voltmeter 63 is electrically connected to the two electrodes of the fuel cell stack 10. Furthermore, a discharge device 80 is electrically connected to the two electrodes of the fuel cell stack 10.

Furthermore, referring to FIG. 1, the fuel cell system 1 is provided with a system control circuit 70. The system control circuit 70 is comprised of a digital computer provided with components connected with each other by a bidirectional bus 71 such as a ROM (read only memory) 72, RAM (random access memory) 73, CPU (microprocessor) 74, input port 75, and output port 76. An acceleration sensor 64 detecting the acceleration of the vehicle is attached to the electric vehicle. An output voltage of the above-mentioned voltmeter 63 and an output voltage of the acceleration sensor 64 are input through corresponding AD converters 77 to the input port 75. On the other hand, the output port 76 is electrically connected through corresponding drive circuits 78 to the fuel gas control valve 33, fuel gas sealing valves 35a, 35b, compressor 43, cathode off-gas control valve 45, stack bypass control valve 47, cooling water pump 52, booster converter 60, inverter 61, and motor-generator 62. Further, a power supply of the system control circuit 70 is comprised of another power supply 79 different from the fuel cell stack 10.

In the embodiment shown in FIG. 1, occurrence or absence of a vehicle collision is detected in the following way. That is, when an acceleration of the vehicle detected by the acceleration sensor 64 is higher than an allowable upper limit, it is judged that a vehicle collision has occurred, while when the vehicle acceleration is lower than an allowable upper limit, it is judged that a vehicle collision has not occurred. When vehicle collision is detected, a collision signal is output to the discharge device 80. Once the collision signal is output, output of the collision signal is continued. On the other hand, when vehicle collision is not detected, the collision signal is not output. In this way, the acceleration sensor 64 and system control circuit 70 constitute a collision detector configured to detect a vehicle collision and to output a collision signal.

Figure 2:
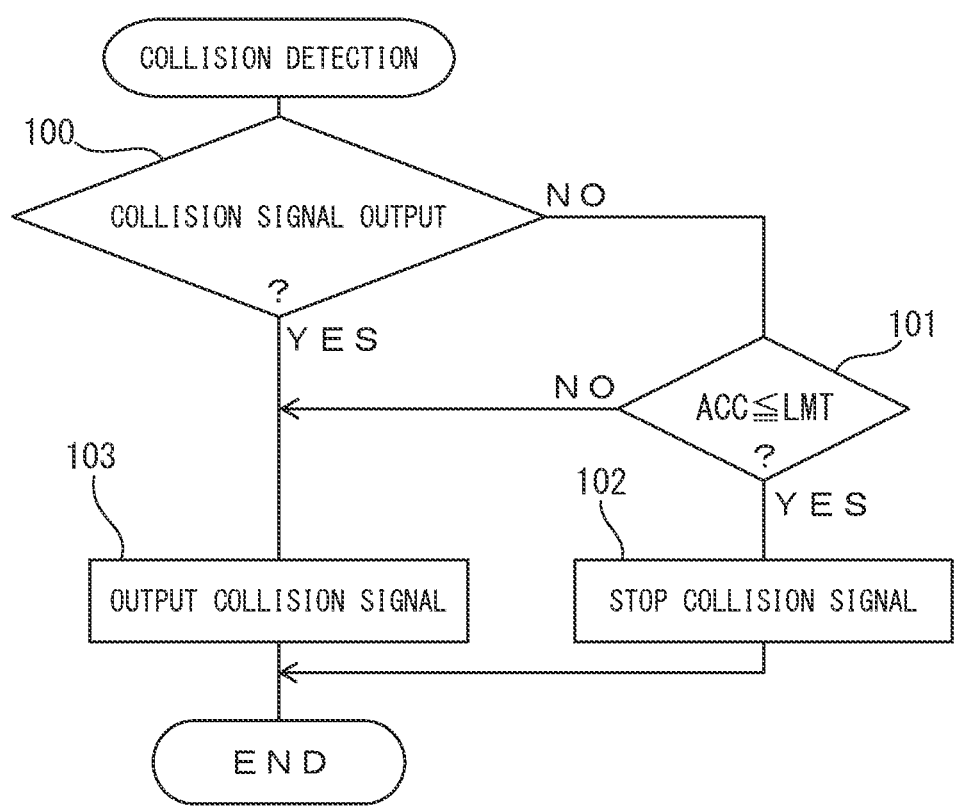
FIG. 2 is a flow chart for performing a collision detection routine.

FIG. 2 shows a routine for performing the above-mentioned detection of vehicle collision. This routine is performed at the system control circuit 70 by interruption every predetermined set time interval.

Referring to FIG. 2, at step 100, it is judged if currently a collision signal is being output. If a collision signal is not being output, next the routine proceeds to step 101 where it is judged if acceleration ACC of the vehicle is lower than the allowable upper limit LMT. If ACC≤LMT, next the routine proceeds to step 102 where the output of the collision signal continues stopped. If ACC>LMT, the routine proceeds from step 101 to step 103 where the collision signal is output. If the collision signal is output, the routine proceeds from step 100 to step 103 where the output of the collision signal is continued.

Figure 3:
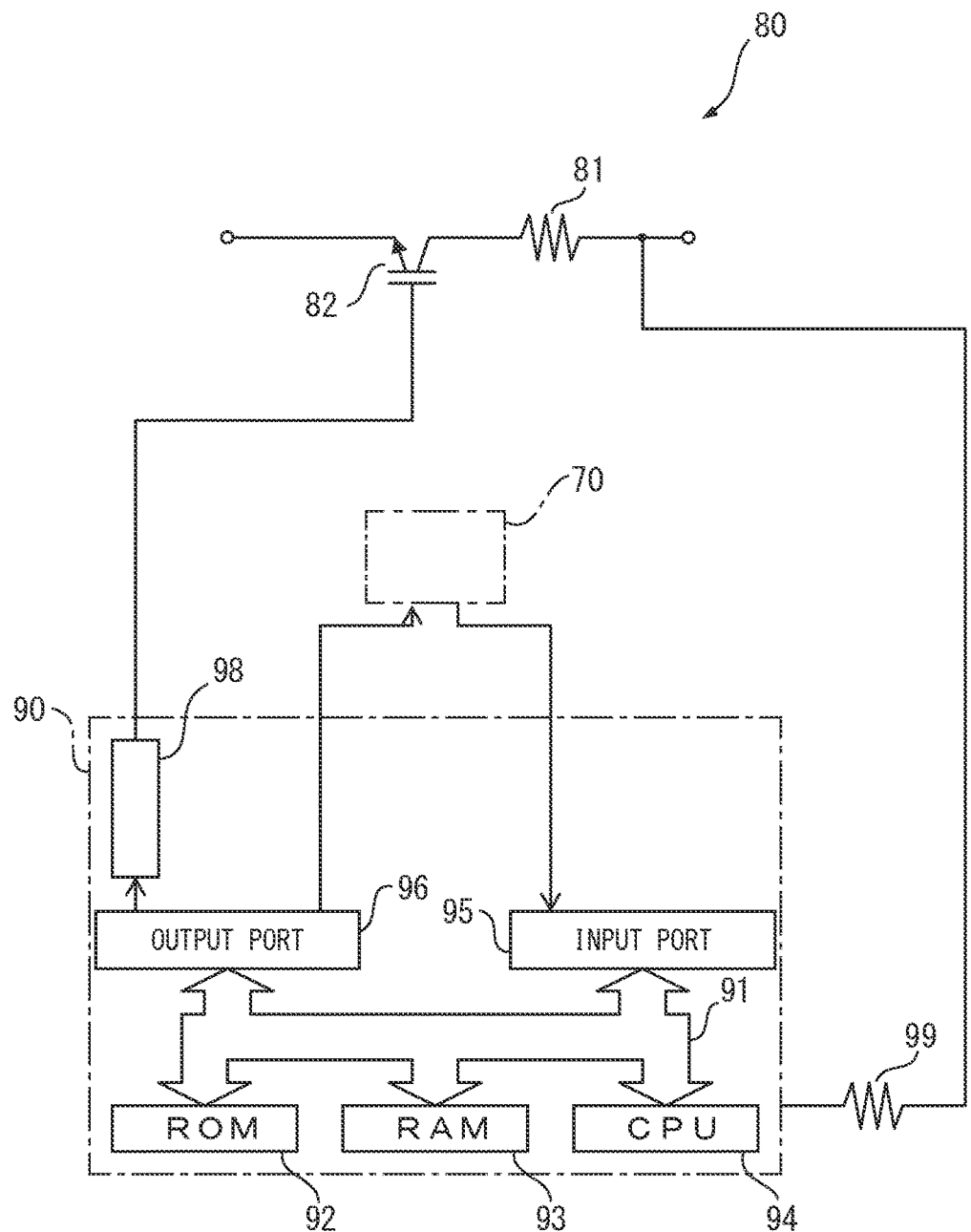
FIG. 3 is an overall view of a discharge device.

FIG. 3 shows one example of the discharge device 80. Referring to FIG. 3, the discharge device 80 is provided with a first electrical resistor for discharge 81 and an electrically controlled type discharge switch 82. In the example which is shown in FIG. 3, the discharge switch 82 is comprised of an insulated gate bipolar transistor (IGBT). One end of the first electrical resistor for discharge 81 is electrically connected to for example the anode of the fuel cell stack 10, while the other end of the first electrical resistor for discharge 81 is electrically connected to a collector of the discharge switch 82. Further, an emitter of the discharge switch 82 is electrically connected to for example the cathode of the fuel cell stack 10. That is, the first electrical resistor for discharge 81 is electrically connected through the discharge switch 82 to the fuel cell stack 10.

Further, the discharge device 80 is provided with a discharge control circuit 90. The discharge control circuit 90 is comprised of a digital computer provided with components which are connected with each other by a bidirectional bus 91 such as a ROM (read only memory) 92, RAM (random access memory) 93, CPU (microprocessor) 94, input port 95, and output port 96. A gate of the discharge switch 82 is electrically connected through a drive circuit 98 to the output port 96. Further, the input port 95 of the discharge control circuit 90 is electrically connected to the output port 76 of the system control circuit 70, while the output port 96 of the discharge control circuit 90 is electrically connected to the input port 75 of the system control circuit 70. That is, the system control circuit 70 and discharge control circuit 90 can communicate with each other.

In the example shown in FIG. 3, a power supply of the discharge control circuit 90 is comprised of the fuel cell stack 10. That is, the discharge control circuit 90 is electrically connected through an electrical resistor 99 to for example the anode of the fuel cell stack 10, continuously. In this case, the output voltage of the fuel cell stack 10 is lowered by the electrical resistor 99 to a drive voltage of the discharge control circuit 90 and sent to the discharge control circuit 90. The drive voltage of the discharge control circuit 90 is for example 24V.

The above-mentioned collision signal which is output from the system control circuit 70 is input to the discharge control circuit 90 of the discharge device 80. When a collision signal is input to the discharge control circuit 90, it applies voltage to the gate of the discharge switch 82 to turn the discharge switch 82 on. Further, the discharge control circuit 90 is configured to turn the discharge switch 82 on when a collision signal is input at the time of startup.

Now then, when the fuel cell stack 10 should generate power, the fuel gas control valve 33 is opened and fuel gas is fed to the fuel cell stack 10. Further, the compressor 43 is driven and oxidizing gas is fed from the compressor 43 to the fuel cell stack 10. As a result, an electrochemical reaction occurs between the fuel gas and the oxidizing gas at the unit fuel cells, and electric power is generated. The thus generated electric power is sent to the motor-generator 62. As a result, the motor-generator 62 is operated as an electric motor for driving the vehicle, and the vehicle is driven.

When vehicle collision is detected, that is, when a collision signal is output, the system control circuit 70 performs "control at collision" of the fuel cell system 1. That is, the motor-generator 62 is stopped. Further, the fuel gas sealing valves 35a, 35b are closed. As a result, the feed of fuel gas to the fuel cell stack 10 is stopped and outflow of the fuel gas from the fuel cell stack 10 is blocked. Furthermore, the compressor 43 is stopped, the opening degree of the cathode off-gas control valve 45 is made the minimum opening degree, and the stack bypass control valve 47 is opened. As a result, the feed of oxidizing gas to the fuel cell stack 10 is stopped and the outflow of oxidizing gas from the fuel cell stack 10 is suppressed. Furthermore, the cooling water pump 52 is stopped. As a result, the feed of fuel gas and oxidizing gas to the fuel cell stack 10 is stopped.

Even if the feed of fuel gas and oxidizing gas to the fuel cell stack 10 is stopped, the fuel gas and oxidizing gas remaining in the fuel cell stack 10 continues the power generation action. For this reason, the fuel cell stack 10 is maintained at a high voltage.

Therefore, in this embodiment according to the present invention, when the collision signal is output, the discharge device 80 causes the fuel cell stack 10 to discharge and thereby lowers the voltage of the fuel cell stack 10.

Figure 4:
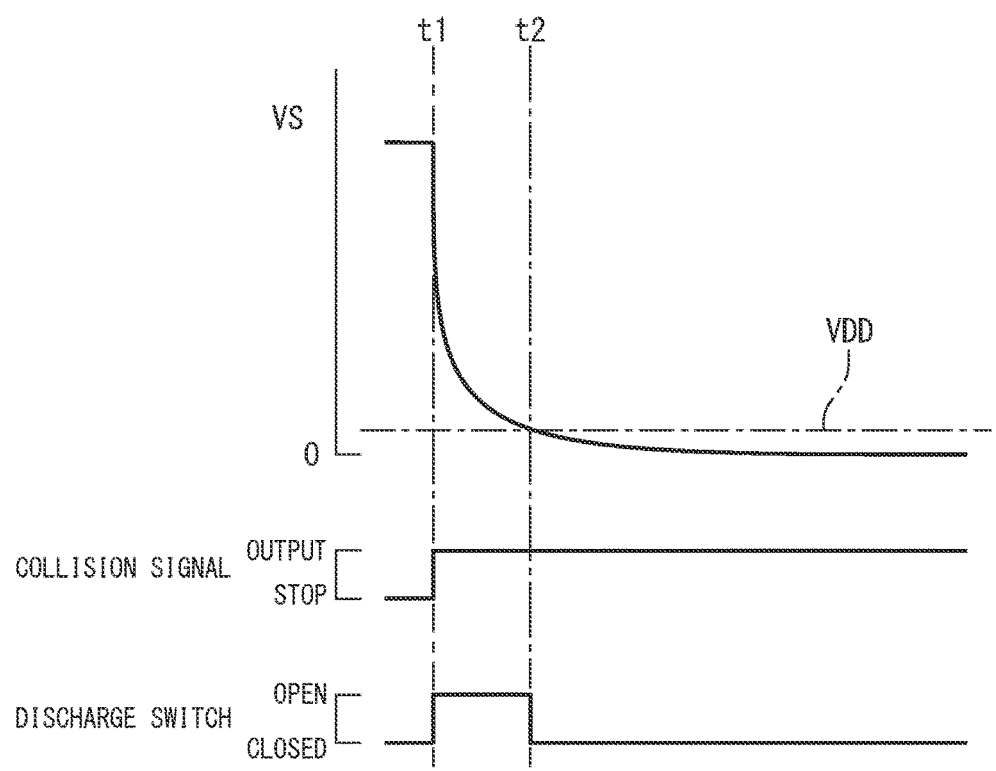
FIG. 4 is a time chart explaining a discharge action.

That is, if a collision signal is output at the time t1 of FIG. 4, the discharge switch 82 is turned on. As a result, the first electrical resistor for discharge 81 is electrically connected to the fuel cell stack 10. Therefore, the electrical power generated by the fuel cell stack 10 is consumed by the first electrical resistor for discharge 81, and the fuel cell stack 10 is discharged.

If the fuel cell stack 10 is discharged, an amount of fuel gas and amount of oxidizing gas remaining in the fuel cell stack 10 gradually decrease and the output voltage VS of the fuel cell stack 10 gradually falls. Next, at the time t2, the output voltage VS of the fuel cell stack 10 becomes lower than the drive voltage VDD of the discharge control circuit 90. In the embodiment shown in FIG. 3, the power supply of the discharge control circuit 90 is comprised of the fuel cell stack 10, so if the output voltage VS of the fuel cell stack 10 becomes lower than the drive voltage VDD of the discharge control circuit 90, the discharge control circuit 90 can no longer operate. As a result, the discharge switch 82 is turned off and the first electrical resistor for discharge 81 is electrically disconnected from the fuel cell stack 10. For this reason, the fuel cell stack 10 is no longer discharged by the first electrical resistor for discharge 81.

In this regard, considering the fact that the volume of the fuel gas passage 30 and the volume of the oxidizing gas passage 40 are substantially the same as each other in the fuel cell stack 10 and the fact that, in a case where oxidizing gas is comprised of oxygen, a ratio of oxygen contributing to the above-mentioned electrochemical reaction to the air which is fed to the fuel cell stack 10 is about 20%, the fall in the output voltage at the time of the discharge action is due to the shortage of oxygen.

When a collision signal is output, the compressor 43 is stopped and the opening degree of the cathode off-gas control valve 45 is made the minimum opening degree, as explained above. In this case, the oxidizing gas or air can pass through the compressor 43 and cathode off-gas control valve 45. For this reason, air may flow in from the oxidizing gas feed path 41 or cathode off-gas passage 44 into the fuel cell stack 10. If air flows into the fuel cell stack 10, the amount of power generated in the fuel cell stack 10 may increase and the output voltage of the fuel cell stack 10 may rise.

In this embodiment according to the present invention, when the output voltage VS of the fuel cell stack 10 raises and reaches the drive voltage VDD of the discharge control circuit 90, the discharge control circuit 90 is restarted. As explained above, the discharge control circuit 90 is configured to turn the discharge switch 82 on if a collision signal is output when the discharge control circuit 90 is started. As a result, the first electrical resistor for discharge 81 is again electrically connected to the fuel cell stack 10, and the first electrical resistor for discharge 81 discharges the fuel cell stack 10. Therefore, the output voltage of the fuel cell stack 10 again falls. In this way, the output voltage VS of the fuel cell stack 10 is maintained low. Next, when the output voltage of the fuel cell stack 10 again becomes lower than the drive voltage VDD of the discharge control circuit 90, the operation of the discharge control circuit 90 is stopped and the discharge switch 82 is again turned off.

In this way, even if air or oxygen flows into the fuel cell stack 10 after the discharge action is started, the output voltage of the fuel cell stack 10 can be maintained low. This means that there is no need to provide a sealing valve which seals the oxidizing gas passage 40 of the fuel cell stack 10 when the collision signal is output. Therefore, it is possible to simplify the configuration of the fuel cell system 1 and to lower the cost thereof.

Figure 5:
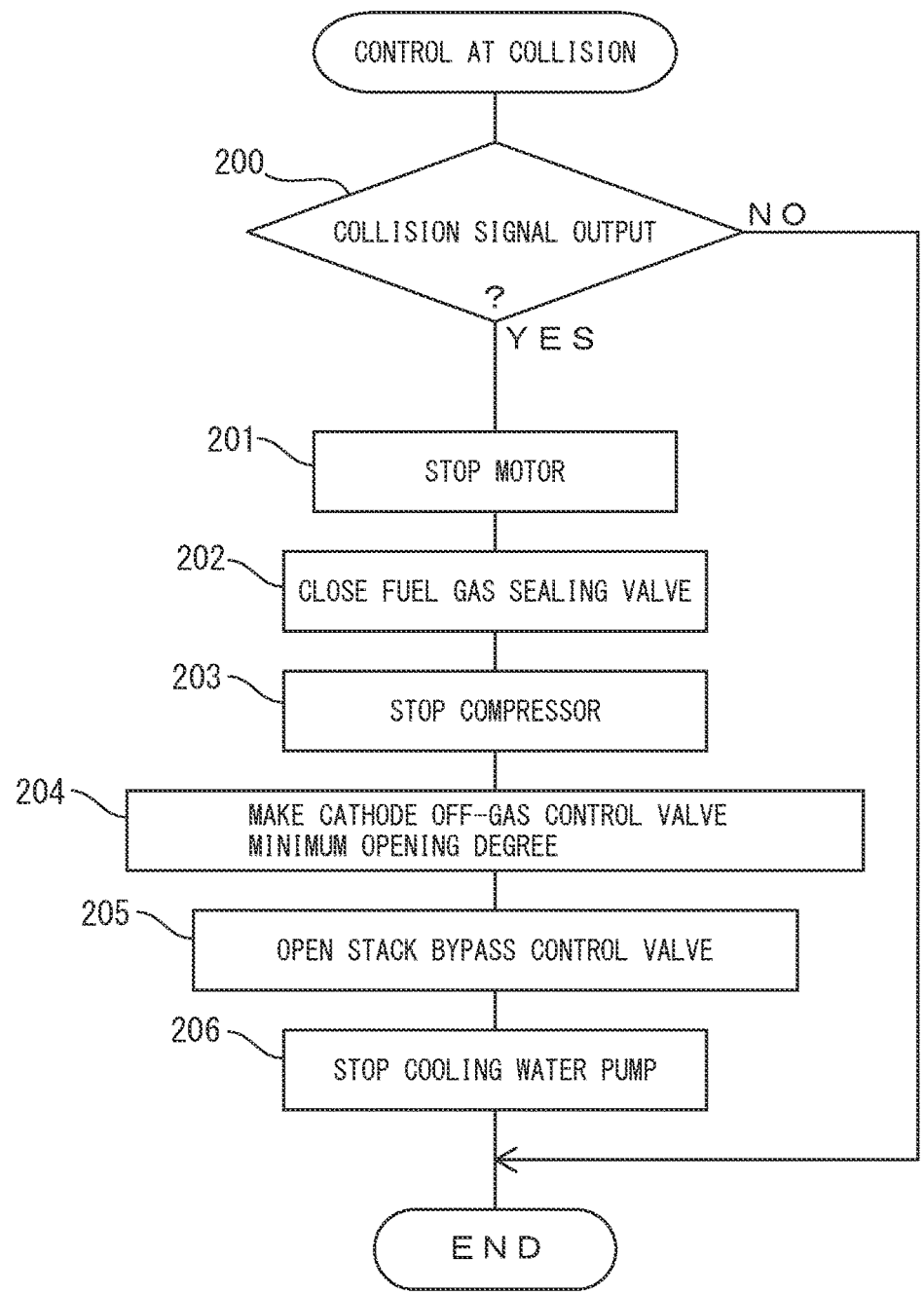
FIG. 5 is a flow chart for performing a routine of control at collision.

FIG. 5 shows a routine for performing control at collision of this embodiment according to the present invention. This routine is performed at the system control circuit 70 by interruption every predetermined set time interval.

Referring to FIG. 5, at step 200, it is judged if a collision signal is being output. If a collision signal is not being output, the processing cycle is ended. If a collision signal is being output, the routine proceeds to step 201 where the motor-generator 62 is stopped. At the next step 202, the fuel gas sealing valves 35*a*, 35*b* are closed. At the next step 203, the compressor 43 is stopped. At the next step 204, the opening degree of the cathode off-gas control valve 45 is made the minimum opening degree. At the next step 205, the stack bypass control valve 47 is opened. At the next step 206, the cooling water pump 52 is stopped.

Figure 6:
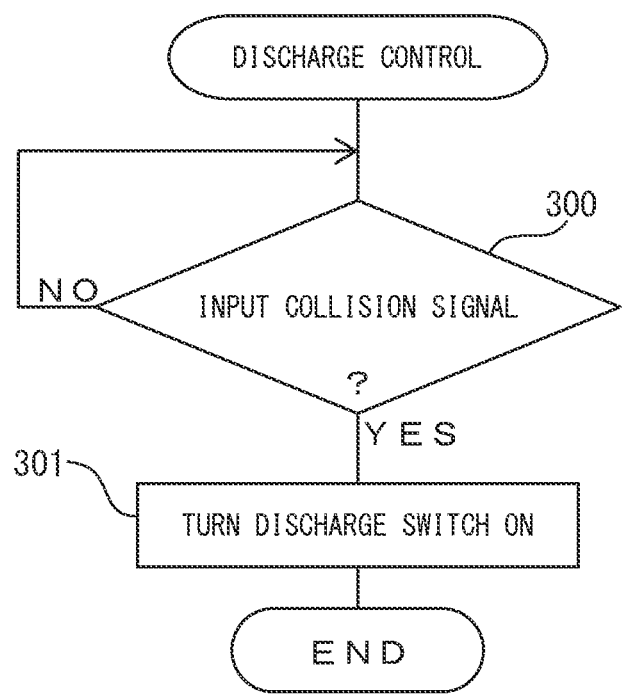
FIG. 6 is a flow chart for performing a routine of discharge control.

FIG. 6 shows a routine for performing discharge control in this embodiment according to the present invention. This routine is performed in the discharge control circuit 90 when the discharge control circuit 90 is started up.

Referring to FIG. 6, at step 300, it is judged if a collision signal has been input to the discharge control circuit 90. If a collision signal has not been input, the routine returns to step 300. If a collision signal has been input, the routine proceeds to step 301 where the discharge switch 82 is turned on.

Next, another embodiment according to the present invention will be explained. If vehicle collision occurs, cables electrically connecting the system control circuit 70 and the discharge control circuit 90 with each other may be damaged. That is, communication between the system control circuit 70 and the discharge control circuit 90 may be impossible. If communication between the system control circuit 70 and the discharge control circuit 90 is impossible, no collision signal is input to the discharge control circuit 90 even when the system control circuit 70 outputs a collision signal. As a result, no discharge action of the fuel cell stack 10 is performed.

Therefore, in this other embodiment according to the present invention, it is judged by the discharge control circuit 90 whether communication between the system control circuit 70 and the discharge control circuit 90 is possible. When the communication is judged to be possible, the discharge switch 82 is turned on upon input of the collision signal. As opposed to this, when the communication is judged to be impossible, the discharge switch 82 is turned on even if no collision signal is input. As a result, the fuel cell stack 10 can be reliably discharged.

FIG. 7 shows a routine for performing discharge control of this other embodiment according to the present invention. This routine is performed at the discharge control circuit 90 when the discharge control circuit 90 is started up.

Referring to FIG. 7, at step 300*a*, it is judged if communication between the discharge control circuit 90 and the system control circuit 70 is possible. If the communication is judged to be possible, the routine proceeds to step 300 where it is judged if a collision signal is being input to the discharge control circuit 90. If no collision signal is being input, the routine returns to step 300*a*. If a collision signal is input, the routine proceeds to step 301. On the other hand, if the communication is judged to be impossible, the routine proceed from step 300*a* to step 301. At step 301, the discharge switch 82 is turned on.

The present application claims the benefit of Japanese Patent Application No. 2014-076444 and incorporates the entirety of the disclosure by reference.

REFERENCE SIGNS LIST 1. fuel cell system
10. fuel cell stack
62. motor-generator
64. acceleration sensor
70. system control circuit
80. discharge device
81. first electrical resistor for discharge
82. discharge switch
90. discharge control circuit

The invention claimed is:

1. A fuel cell control system mounted in an electric vehicle comprising:
 a fuel cell stack configured to generate electric power by an electrochemical reaction between fuel gas and oxidizing gas and to supply the generated electric power to an electric motor for driving the vehicle;
 a first discharge electrical resistor which is electrically connected to the fuel cell stack through an electrically controlled discharge switch, and the electrically controlled discharge switch is comprised of an insulated gate bipolar transistor (IGBT);
 a discharge control circuit configured to control an on/off state of the electrically controlled discharge switch;
 a system control circuit, different from the discharge control circuit, for controlling an operation of the fuel cell stack; and
 a collision detector configured to detect a vehicle collision and to output a collision signal to the discharge control circuit,
 wherein a power supply of the discharge control circuit is electrically connected to an anode of the fuel cell stack through a second electrical resistor,
 wherein when the collision signal is output, the system control circuit controls the fuel cell control system so that a feed of fuel gas to the fuel cell stack is stopped and outflow of the fuel gas from the fuel cell stack is blocked, and a feed of oxidizing gas to the fuel cell stack is stopped and the outflow of oxidizing gas from the fuel cell stack is suppressed,
 when the collision signal is input to the discharge control circuit from the collision detector, the discharge control circuit turns the electrically controlled discharge switch on to electrically connect the fuel cell stack to the first discharge electrical resistor, so that electrical power generated by the fuel cell stack is consumed by the first discharge electrical resistor, to thereby discharge the fuel cell stack, and
 a power supply of the system control circuit is comprised of another power supply different from the fuel cell stack.

2. The fuel cell control system mounted in electric vehicle according to claim 1, wherein the discharge control circuit is configured to turn on the discharge switch when a collision signal is input to the discharge control circuit at a time of startup.

3. The fuel cell control system mounted in an electric vehicle according to claim 1, wherein the discharge control circuit is configured to judge if communication between the discharge control circuit and the collision detector is possible, to turn the discharge switch on upon a collision signal being input when the communication is judged to be possible, and to turn the discharge switch on even without a collision signal being input when the communication is judged to be impossible.

* * * * *